United States Patent Office 3,240,687
Patented Mar. 15, 1966

3,240,687
PROCESS FOR THE MANUFACTURE OF WATER-SOLUBLE BASIC ALUMINUM COMPOUNDS
Josef König and Hans-Karl Platzer, Gersthofen, near Augsburg, Germany
No Drawing. Filed Jan. 18, 1962, Ser. No. 167,189
Claims priority, application Germany, Jan. 20, 1961, F 33,006
4 Claims. (Cl. 204—94)

The present invention relates to a process for the manufacture of water-soluble basic aluminum compounds.

It is known that hydrochloric acid can dissolve a larger amount of aluminum than would have been expected from the equation $$Al + 3HCl \rightarrow AlCl_3 + \tfrac{3}{2}H_2 \qquad (1)$$

The dissolution of aluminum in hydrochloric acid is more adequately described by the following equation $$2Al + HCl + 5H_2O \rightarrow Al_2(OH)_5Cl + 3H_2 \qquad (2)$$

In this manner, highly basic aluminum compounds can be obtained by dissolving aluminum in dilute hydrochloric acid at elevated temperatures. This mode of proceeding is, however, lengthy because after an initially vigorous reaction the conversion decreases as the density and pH-value of the reaction mixture increase.

It is also known to obtain water-soluble highly basic aluminum compounds by electrolysis of aqueous solutions of aluminum salts, for example $AlCl_3$. These processes use unattackable electrodes made, for example, of graphite and cell potentials within the range of 4.2 to 4.5 volts and current densities within the range of 1800 to 2600 amperes per square meter. The expenditure of electric energy is very high and chlorine gas and hydrogen gas are evolved as undesired by-products which can be handled safely only by using complicated apparatus. Moreover, these processes yield only mixtures of various basic salts.

Now we have found that aqueous solutions of highly basic aluminum salts of the general formula $$Al_2(OH)_n X_{6-n}$$

in which X represents a halide anion of an atomic weight within the range of 35 to 127 and $n$ represents a number within the range of 3 to 5, can be obtained in an advantageous manner by electrochemical activation, i.e., polarization, of the aluminum to be reacted. Electrochemical activation is brought about by applying direct current voltage to aluminum electrodes immersed in an aqueous solution of a hydrohalic acid. The voltage and intensity of the direct current applied are adjusted in a manner such that the discharging potentials of the anions present in the electrolyte, i.e., the halide and hydroxy anions, are not reached. For example, a voltage of 0.3 to 0.8 volt may be used with a current density of 150 to 300 amperes per square meter.

As hydrohalic acids there may be used in the process of the invention hydrochloric acid, hydrobromic acid or hydriodic acid. The concentration of the solution of the acid should be such that the pH-value is at most 4. Advantageously, the pH-value is 1 to 2 pH-units below that limit, at least in the beginning of the reaction.

The current which flows through the system owing to the direct voltage applied, brings about a dissolution of the aluminum, without simultaneous evolution of chlorine and oxygen, and at the same time prevents the formation of insulating layers of basic aluminum salts on the electrode surfaces. Both aluminum electrodes dissolves in the electrolyte with formation of basic aluminum compounds, the course of the reaction of Equation 2 being not retarded throughout the entire reaction.

The terminus of the reaction at which according to Equation 2 all the aluminum used as the starting material has been converted into $Al_2(OH)_5X$ and a ratio of Al:Cl of 2:1 prevails in the electrolyte, is indicated by a pronounced increase of the cell potential with regulated current. If it is desired to obtain as the end product of the reaction a compound of the formula $Al_2(OH)_5X$, the electrode potential can therefore be increased, while the passage of current is maintained constant, until the discharging potential of an anion present in the solution is reached and then the reaction may be interrupted. If it is desired to obtain basic aluminum compounds other that $Al_2(OH)_5X$ as reaction products, the reaction must be interrupted at an earlier moment, that is before the cell potential is essentially increased with regulated current. The moment at which the reaction has to be interrupted is determined empirically depending on the compound to be obtained. This can be done, for example, by taking test samples from the reaction solution and analyzing them.

The process of the invention has the further advantage that the amount of electricity needed for reacting 1 gram of aluminum is considerably lower than the amount theoretically necessary for the electrochemical reaction of 1 gram of aluminum. For the manufacture of $$Al_2(OH)_5Cl$$

for instance, only about 1.5 to 1.7 ampere-hours, instead of 3 ampere-hours, are needed for each gram of aluminum to be converted. Calculated on the electrical power, this means that in the electrolysis of an aluminum salt about 13.5 killowatt-hours are necessary for the conversion of 1 kg. of aluminum, while only about 1 kilowatt-hour is needed for dissolving 1 kg. of aluminum by the electrochemical activation according to the invention.

Another advantage of the process of the invention is that the heavy metals, for example iron, contained as impurities in the aluminum electrodes are precipitated at the cathode. They do not react with the electrolyte and can be seperated from the reaction product without difficulty. The reaction products are therefore distinguished by a particularly high degree of purity and a very small iron content.

For carrying out the process of the invention, it is not necessary to connect each individual aluminum electrode with the positive or negative pole of the source of current in order to obtain an electrochemical activation of the electrode surfaces. The electrodes are also activated when they are arranged in a bipolar manner. This mode of executing the electrochemical activation is particularly advantageous for carrying out the process on an industrial scale since the current supply for the electrodes is constructed in a simple manner and it is only necessary to connect the front plate and the end plate of the whole series of electrodes to the source of current. The electrodes situated between the front plate and the end plate are then in an electrical direct voltage field by which they are polarized.

In the electrolyte with which the cell is filled and which initially consists only of aqueous hydrohalic acid, a brine of a colloidal water-soluble halide-containing aluminum hydroxide of the formula $Al_2(OH)_n X_{6-n}$ and hydrogen are formed in the course of the reaction by dissolution of aluminum. When an increase of the cell potential indicated that aluminum begins to dissolve beyond the formation of $Al_2(OH)_5X$, the current is interrupted and the contents of the cell are withdrawn before aluminum compounds that are poorer in halide deposit.

The liquid withdrawn from the cell is concentrated in known manner or evaporated to dryness. In the latter case, a white product is obtained for example by evaporation with the help of a scale roller, which product dissolves in water to yield a clear solution of hardly perceptible opalescence.

The following examples serve to illustrate the invention but they are not intended to limit it thereto.

*Example 1*

Into a 5 liter trough lined with a corrosion-resistant material, about 4.8 liters of aqueous hydrochloric acid (density 1.043) were introduced and then four aluminum electrodes were suspended in the electrolyte at a distance of 40 mm. one from the other. The first and the last electrode were connected to the positive and negative poles, respectively, of a direct voltage source. The current was adjusted to 4.7 amperes and kept at that value during the reaction so that the electrodes were charged with a current density of 170 amperes per square meter. Under these conditions, the cell potential amounted on an average to 1.8 volts, corresponding to 0.6 volt for each pair of electrodes, during the electrochemical activation.

After 76 hours, 650 grams aluminum had passed into solution, the density of the electrolyte rising from 1.043 to 1.285. In the course of the experiment the pH-value rose to about 4. The ratio aluminum:chlorine in the electrolyte amounted to 1.97:1. The cell potential increased considerably at that moment while the conductivity of the electrolyte decreased simultaneously since all free hydrochloric acid had been consumed in the formation of $Al_2(OH)_5Cl$.

The electrolyte then constituted an aqueous solution of the highly basic aluminum salt, $Al_2(OH)_5Cl$, which contained 10.6% of aluminum and 7.08% of chlorine. The aqueous solution was evaporated to dryness, and the dried mass was conmminuted to obtain a white powder containing 27.2% of aluminum and 17.68% of chlorine, the molar ratio Al:Cl amounting to 2.02:1.

The energy consumption amounted to 0.99 kilowatt-hour per kilogram of aluminum. The current consumption was 1.65 ampere-hours per gram of aluminum.

*Example 2*

Into a 1 liter trough lined with a corrosion-resistant material, 800 cc. of aqueous hydrobromic acid (density 1.160) were introduced and four aluminum electrodes suspended at a distance of 25 mm. one from the other. The first and the last electrode were connected to the positive and negative poles, respectively, of a direct voltage source. The current was adjusted to 1.5 amperes and kept at that value during the reaction so that the electrodes were charged with a current density of 160 amperes per square meter. Under these conditions, the cell potential amounted on an average to 1.34 volts, corresponding to 0.447 volt for each pair of electrodes, during the electrochemical activation. After 81 hours, 128 grams aluminum had passed into solution, the density of the electrolyte rising from 1.160 to 1.419. In the course of the experiment, the pH-value rose to about 4. The ratio aluminum:bromine in the electrolyte was 2.01:1. The cell potential increased considerably at that moment, while the conductivity of the electrolyte decreased since all free hydrobromic acid had been consumed for the formation of $Al_2(OH)_5Br$.

The electrolyte then constituted an aqueous solution of the highly basic aluminum salt, $Al_2(OH)_5Br$, containing 10.9% of aluminum and 16.05% of bromine.

The energy consumption amounted to 1.27 kilowatt-hours per kilogram of aluminum.

*Example 3*

Into a 1 liter trough lined with a corrosion-resistant material, 800 cc. of aqueous hydriodic acid (density 1.27) were introduced and 4 aluminum electrodes suspended at a distance of 25 mm. one from the other. The first and the last electrode were connected to the positive and negative poles, respectively, of a direct voltage source. The current was adjusted to 1.5 amperes and kept at that value during the reaction so that the electrodes were charged with a current density of 160 amperes per square meter. Under these conditions, the cell potential amounted on an average to 1.68 volts, corresponding to 0.56 volt for each pair of electrodes, during the electrochemical activation. After 115 hours, 130 grams aluminum had passed into solution, the density of the electrolyte rising from 1.27 to 1.54 in the course of the experiment, the pH-value of the electrolyte rose to about 4. The ratio aluminum:iodine in the electrolyte was 2.01:1. The cell potential increased considerably at that moment, while the conductivity of the electrolyte decreased since all free hydriodic acid had been consumed for the formation of $Al_2(OH)_5I$.

The electrolyte then constituted an aqueous solution of the highly basic aluminum salt, $Al_2(OH)_5I$, containing 10.6% of aluminum and 24.8% of iodine.

The energy consumption amounted to 2.27 kilowatt-hours per kilogram of aluminum.

*Example 4*

Into a 1 liter trough lined with a corrosion-resistant material, 800 cc. of aqueous hydrochloric acid (density 1.043) were introduced and four aluminum electrodes suspended in the electrolyte at a distance of 25 mm. one from the other. The first and the last electrode were connected to the positive and negative poles, respectively, of a direct voltage source. The current was adjusted to 1.5 amperes and kept at that value during the reaction so that the electrodes were charged with a current density of 160 amperes per square meter. Under these conditions, the cell potential amounted on an average to 1.06 volts, corresponding to 0.35 volt for each pair of electrodes, during the electrochemical activation. After a reaction time of 7, 22, 31 and 43 hours, respectively, test samples were taken from the electrolyte and analyzed. The analysis showed that the electrolyte had been converted approximately proportionally to the reaction time into solutions of basic aluminum chlorides in which the following stoichiometric ratios of aluminum:chlorine were determined:

After 7 hours, Al:Cl _____ 0.65:1
After 22 hours, Al:Cl _____ 1.25:1
After 31 hours, Al:Cl _____ 1.58:1
After 43 hours, Al:Cl _____ 2:1

After about 7 hours, the electrolyte thus constituted a solution of the basic aluminum salt, $Al_2(OH)_3Cl_3$, the ratio Al:Cl being 0.66:1. In the further course of the reaction, the $Cl^-$ ions were gradually replaced by $OH^-$ ions and after 43 hours the final product $Al_2(OH)_5Cl$ with a ratio of Al:Cl of 2:1 was obtained. The reaction could thus be controlled in a manner such that the stoichiometrical composition of the products obtained corresponded to the formula $Al_2(OH)_mX_n$ in which $m$ is a number within the range of 3 to 5, $n$ is a number within the range of 1 to 3, $m+n$ is equal to 6 and X stands for $Cl^-$.

The terminus of the reaction for the formation of a product of the formula $Al_2(OH)_mX_n$ in which $n$ is a number within the range of 1 to 3 and is not equal to 1, can easily be determined empirically with the help of the above indicated test series.

When $n$ is set to equal 1, conditions analogous to those described in Example 1 exist with respect to the terminus of the reaction and the composition of the product. When X represents Br or iodine corresponding test series are obtained.

We claim:

1. A process for the manufacture of a water-soluble basic aluminum compound of the formula $$Al_2(OH)_nX_{6-n}$$

wherein X is a halide anion having an atomic weight between 35 and 127 and $n$ is an interger within the range of 3 to 5, which process comprises dissolving in an aqueous solution of a hydrogen halide, said solution containing halide and hydroxy ions, metallic aluminum electrodes polarized to a potential below that at which the halide and hydroxy ions present in said solution are discharged.

2. The process of claim 1 wherein the halide anion is the chloride anion.

3. The process of claim 1 wherein the current density at the aluminum electrodes is maintained constant.

4. A process for the manufacture of $Al_2(OH)_5Cl$ which comprises dissolving in an aqueous hydrogen chloride solution, said solution containing chloride and hydroxy ions, metallic aluminum electrodes polarized to a potential below which the chloride and hydroxy ions present in the solution are discharged, increasing the potential in such a manner that a constant current density is maintained, and terminating the reaction when the potential of the aluminum reaches the potential at which the chloride and hydroxy ions are discharged.

References Cited by the Examiner
UNITED STATES PATENTS

| | | | |
|---|---|---|---|
| 1,769,659 | 7/1930 | Williams | 204—182 |
| 2,196,016 | 4/1940 | Huehn et al. | 23—92 |
| 2,392,531 | 1/1946 | Huehn et al. | 204—95 |
| 2,468,766 | 5/1949 | Low | 204—94 |
| 2,492,085 | 12/1949 | Anderson | 204—95 |
| 2,673,837 | 3/1954 | Lowe et al. | 204—94 |

FOREIGN PATENTS

| | | |
|---|---|---|
| 150,140 | 3/1953 | Australia. |
| 489,769 | 8/1938 | Great Britain. |

JOHN H. MACK, *Primary Examiner.*

JOHN R. SPECK, MURRAY TILLMAN, *Examiners.*